United States Patent

[11] 3,604,528

| [72] | Inventor | William A. Williamson |
| | | Niles, Mich. |
| [21] | Appl. No. | 829,545 |
| [22] | Filed | June 2, 1969 |
| [45] | Patented | Sept. 14, 1971 |
| [73] | Assignee | Clark Equipment Company |

[54] STEERING CONTROL
7 Claims, 2 Drawing Figs.

| [52] | U.S. Cl. | 180/79.2 R |
| [51] | Int. Cl. | B62d 5/04 |
| [50] | Field of Search | 180/79.2, 79.2 B |

[56] References Cited
UNITED STATES PATENTS

| 2,783,849 | 3/1957 | Armington et al. | 180/79.2 C |
| 2,848,246 | 8/1958 | Ruf | 180/77 S |
| 3,185,245 | 5/1965 | Hoyt | 180/79.2 C |
| 3,202,238 | 8/1965 | Strader | 180/79.2 C |
| 3,390,735 | 7/1962 | Medley et al. | 180/79.2 B |

*Primary Examiner*—Benjamin Hersh
*Assistant Examiner*—John A. Pekar
*Attorney*—Hobbs & Green ABSTRACT: Electrohydraulic servosystem providing for multiple modes of steering for a vehicle having spaced wheel steering assemblies preferably adjacent ends of the vehicle. Spaced operator's control positions are provided one adjacent each wheel assembly, either of which may be selectively controlled by an operator positioned therein, for modes of steering such as crab steering and radiarc steering. The wheel steering assembly assuming the new mode of steering, in transition from one mode to the other, bears the same relationship to the vehicle driver (operator) position regardless of the end of the vehicle from which steering is controlled.

INVENTOR
WILLIAM A. WILLIAMSON
BY
Hobbs & Green
ATTORNEYS

STEERING CONTROL

BACKGROUND OF THE INVENTION

The mechanical link-type connections between wheel steering assemblies for accomplishing multimode steering and for changing the mode while in operation have objectionable features including an important one wherein the same wheel assembly always accomplishes the change in mode and in the the case of two-position control stations one at each end of the vehicle selectively operable, this is objectionable as there is no standard relationship of operation from each driver position when there is a change from one mode of steering to another. As long as the vehicle is always driven from an operator's position at the same control station, the object as to relationship is not apparent as the operator can become accustomed to the fact that a certain wheel assembly is making the change in the same relationship to his position. However, when a vehicle is designed with two operator positions one at each end of the vehicle, neither end being defined as the front or rear, there is a major inconvenience and tendency toward confusion as well as a possible safety hazard in making a transition. For example, if the operator were maneuvering the vehicle in a crab mode of steering, turning to the right, and activated the controls to change to the radiarc mode of steering,——then if the axle or wheel assembly nearest the operator, as then located, were to make the correction the vehicle would make a radiarc turn to the left. If, however, the operator were at the other cab or position at the other end of the vehicle under identical conditions, that is, making a crab turn to the right and switched modes—the wheel assembly or axle on the opposite end of the vehicle would make the transition, thereby putting the vehicle in a radiarc turn to the right which would be confusing as it would not be in the same relationship to the operator as would occur with the operator at a position on the opposite end of the vehicle.

SUMMARY

A steering control for a vehicle affording multiple modes of steering from spaced driver operator positions adjacent spaced wheel steering assemblies, with vehicle control mechanism constructed and arranged to effect transition from one mode to steering to another while maintaining the same relationship of controls relative to the operator whether or not such operator is positioned at one spaced operating position or at another spaced operating position. Preferable structure employs an electrohydraulic servo system having symmetrical arrangement of components for control from each of spaced control positions with means to control relative positioning and relative direction of steering movement of spaced wheel assemblies as required in various modes of steering.

It is an object of the invention to provide steering control in a plurality of modes by actuating components symmetrically arranged relative to spaced operator positions so that steering relationship of components and controls relative to the operator will be substantially the same when the operator is located in either of two spaced operator positions on the vehicle.

It is a further object to provide means for steering control selectively in a plurality of modes with transition from one mode to the other accomplished by electrohydraulic servomechanism.

It is another object to eliminate linkage between cabs and axles and between one axle and the other to reduce complexity and maintenance, thereby simplifying design and construction and reducing cost.

It is a further object to provide automatic alignment between wheel steering assemblies.

It is another object to provide means to bring spaced wheel assemblies into desired relative position for the effecting of desired steering modes and to actuate said wheel assemblies in a relative steering movement in said modes.

It is a further object to provide means to actuate a remotely positioned wheel assembly relative to an operator station in a steering mode in relationship to an adjacent wheel assembly so that said adjacent wheel assembly makes the initial transition from one mode of steering to the other and the remote wheel assembly is brought into relationship with said adjacent wheel assembly thereby to actuate and steer said vehicle in desired steering modes. The above and other objects of the invention will appear more fully from the following description and by reference to the accompanying drawings.

DRAWINGS

DESCRIPTION OF ILLUSTRATIVE STRUCTURE

As a preliminary explanation it is here stated that a crab mode of steering in a four wheel vehicle provides for steering of spaced wheel steering assemblies generally located near each end of the vehicle. The wheels at one end of the vehicle turn in a steering direction the same as at the opposite end so that when there is; for example, a crab turn to the right there will be an oblique movement of the vehicle to the right, which movement will be a transition of the entire vehicle diagonally sideways with the longitudinal center line of the vehicle assuming successive parallel positions.

A radiarc mode of steering is a control of the wheel steering assemblies at each end of the vehicle so that both of the wheel assemblies roll on an arc which is the radius of the so-called radiarc turn. This is accomplished by steering the wheels at one end of the vehicle in the opposite direction for those at the other end, both turns being in substantially equal amounts and the angular amount of the steering turn of the wheels determines the radius of turn.

Figure 1:
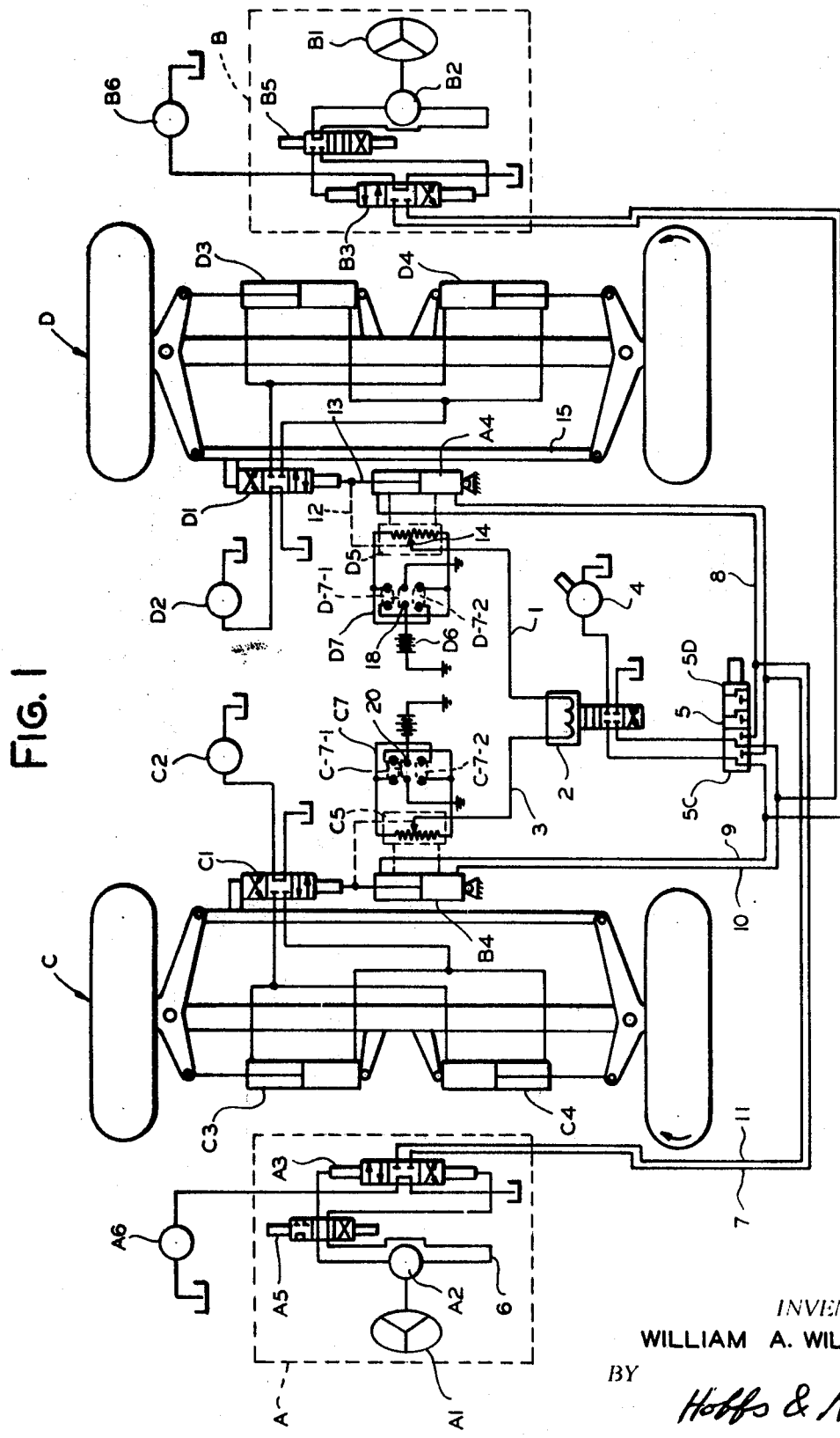
FIG. 1 is a diagrammatic showing in plan view looking down on the top of the vehicle showing the several components of the steering control and their location relative to spaced steerable wheel assemblies.

Referring to FIG. 1, there is shown the arrangement of the steering control system with the various components and their location relative to a plan view looking down on the top of the vehicle, spaced axles or wheel steering assemblies, with steerable wheels, one wheel on each side of the vehicle, one such assembly being preferably adjacent each end of the vehicle frame. The several control elements are positioned in their general location relative the spaced wheel steering assemblies, both of which assemblies are steerable.

The system and its elements are shown in diagrammatic form in FIG. 1 rather than in complete detail. Operator's positions A and B are located at each end of the vehicle adjacent the wheel assemblies, sometimes referred to herein as axles. Each of these operator's positions A and B (see FIG. 1) have a steering wheel A1 for position A and B1 for position B and connections therefrom to operate and control the vehicle from either position as may be desired. The operator's position A is adjacent to axle C (also referred to as wheel steering assembly C), and the connections and arrangements of the mechanism of this position A and axle C are substantially symmetrical with the arrangement of the mechanism for position B at the opposite end of the vehicle which is adjacent to Axle D (also referred to as wheel steering assembly D). Corresponding control elements are available for each position and therefore substantially duplicate descriptions would be necessary to describe controls from both positions A and B.

Considering the operator's position A, it contains certain elements of a hydrostatic steering system. Steering wheel A1 is connected to a manual hand pump A2 which feeds the oil (hydraulic fluid) to the pilot section of control valve A3. This action causes the main section of valve A3 to open which allows pressurized oil from pump A6 to communicate with cylinder A4 which is located at the other end of the vehicle adjacent to Axle D, the position A being understood as located adjacent to Axle C. The oil under pressure for actuating the cylinder A4 from the steering wheel A1 is received from pump A6.

Considering again the steering wheel A1 and its pump A2 adjacent to position A, the oil from the pump A2 is fed through the oil line 6 which leads through the solenoid operated valve A5 to the previously mentioned control valve A3 which when actuated feeds, under pressure for pump A6, the oil rough lines 7 and 8 to the cylinder A4, as previously mentioned. The base of the cylinder A4, which it is remembered, is located adjacent the axle D is pivotally connected to he frame of the vehicle and the rod 13 extended therefrom is connected to a hydraulic servo valve D1. This valve receives oil from pump D2 and delivers it to cylinders D3 and D4 adjacent axle D which do the actual steering of the wheels of the Axle D.

At this point, it should be noted that the particular component arrangement shown is for a very large vehicle in which it is advisable to use the hydrostatic steering portion merely as a pilot from the main steering system. If the vehicle were small enough so that very large steering components were not required, it would be possible to connect the rod of cylinder A4 directly to the tie rod 15 of the axle D and perform the hydraulic steering function without the much larger servo components indicated by D1 through D4 which are really powered servo actuators put in operation by the servo valve D1.

At this point also it is stated that there is equivalent mechanism at the other end of the vehicle near station A and adjacent axle C for use when the operator steers from station B with equivalent mechanism to that just described for actuating axle C in a steering mode by means of the cylinder B4 which is adjacent the servo valve C1 and which actuates the steering cylinders C3 and C4 to steer the wheels of axle C in the same manner as just described for actuating cylinders D3 and D4 to steer axle D.

Continuing with the mechanism which is in operation when the steering is accomplished from operator's position A, which operates cylinder A4 for steering axle D, it is noted that connected to cylinder A4 by connector 12 and rod 13 is a variable electrical resistor D5. The body of the resistor is rigidly connected to the barrel of the cylinder A4 by connector 16 and wiper 14 of the resistor is connected to the actuating rod 13 extending from gland end of the cylinder A4 to actuate the servo valve D1. It can be determined on inspection that as the rod 13 from cylinder A4 moves in one direction or the other, an electrical signal is generated from resistor D5. This signal is powered by the battery D6 and is under control as far as direction of current flow is concerned by a switching arrangement D7. This signal is fed through the wire 1 into servo valve 2 located in the center of the diagram which signal is compared at that position with a signal coming from variable resistor C5 through a wire 3. A similar resistor C5 is connected to the cylinder B4 which has been mentioned previously and which has been pointed out as a corresponding means for actuating the wheels of Axle C in a steering mode. As long as the signal from resistor D5 is the same value as from resistor C5, the servo valve 2 (center of diagram) will be inactive. However, any signal error (difference in value or direction) generated between the two will cause the servo valve 2 to actuate in a direction that will attempt to eliminate the signal error. In doing so, the servo valve 2 will draw oil from the pump 4 and deliver it through valve 5 to cylinder B4 which is connected to axle C. This oil entry will cause cylinder B4 to actuate in direction that will (1) eliminate the signal error; and (2) will steer axle C. The direction in which axle C steers is dependent on the polarity of resistor D5 as established by switching mechanism D7. It is, therefore, to be noted that the two switching mechanisms D–7–1, D–7–2 and C–7–1, C–7–2 which have switch actuators 18 and 20 respectively, may be set to either –7–1 and D–7–1 to accomplish steering of the axles in opposite directions or when one of the switch actuators 18 and 20 are in the opposite location, will cause connection to D–7–2 or C–7–2 to cause steering of the axles C and D in the same direction. As has been discussed in reference to the terms "radiarc" and "crab" steering, it is characteristic of these two modes respectively, that is for "radiarc" steering the two axles will be steered so that the wheels steer in opposite directions to each other and in the "crab" mode, the wheels will be steered in the same direction on both of the axles instead of in opposite directions on each axle as in the radiarc mode. It appears also that the switching mechanisms 18 and 20 control the relative steering direction of wheels on the axles and, therefore, determines whether the steering is in the "radiarc" mode or the "crab" steering mode, and is, therefore, the means of controlling the relative steering between the two axles, and this is accomplished by the above described variation in the polarity of the resistors D5 and C5 and the transition from one to the other is accomplished by the error signals generated to the serve valve 2 and the connected lines as above described.

The following description of a normal operation includes explanation which may assist in a better understanding of the mechanism. If it is assumed that position A has control of the steering which includes the assumption that valve A5 is in the open condition as sown and valve B5 is in the bypass position also as shown. It is then a result of the functioning of the structure as shown that any attempt to steer the vehicle from the operator's position B, rather than from position A, will merely result in the oil from hand pump B2 recirculating through that pump as will be noted from the line connection from pump B2 through the valve B5 which is closed to and from the pump B2. In this illustration it is assumed that switch C7 is actuated to the C–7–2 position and the switch D7 to the D–7–2 position which is the condition as previously described causing the wheels on axles C and D to steer in relatively opposite steering directions which is the condition for "radiarc" steering. Also valve 5 at the center of the diagram below the servo valve 2 is actuated to the 5C position. This means that any oil delivered through valve 2 will be directed to actuate steering axle C. As previously mentioned, these conditions set the mechanism for "radiarc" steering, that is, the wheels on opposite ends of the vehicle will be turned in opposite directions relative to the axles in such a position that they would move on a common arc or turn. The condition above described results in the following manner: assuming that the driver in the cab at position A turns the steering wheel A1 to the right ad the hand pump A2 causes pressurized oil to flow through line 6 to the pilot valve A3 causing it to actuate that valve permitting pressurized oil from pump A6 to enter line 7. This oil, continuing, flows to line 8. One end of line 8 is blocked at valve therefore, the pressurized oil enters the gland end of cylinder A4 (adjacent axle D). This admission of oil to cylinder A4 at the gland end causes the cylinder to collapse toward the base end as shown by the indicating arrow. This action causes the servo valve D1 to actuate by the rod extending from the gland end of cylinder A4 to actuate servo valve D1 in a manner which will pressurize the base of steering cylinder D3 and the gland end of steering cylinder D4. This, as shown by the indicated arrows marked on these units, will cause axle D to steer the wheels of this axle D in a counterclockwise direction as shown by indicated arrows on these wheels. The movement of cylinder A4, i.e., shortening length of rod 13 from that cylinder which is connected to the wiper will cause that wiper on the variable resistor D5 to move toward a lower voltage position. This lower voltage signal will be sent through wire 1 into servo valve 2 and will be compared with a signal from resistor C5 which is the resistor adjacent the axle C and this will establish a so-called error signal. This error signal actuates the servo valve 2 at the center of the diagram in a manner which will allow pressurized oil from pump 4 to enter line 9. This oil, in turn, enters the gland end of cylinder B4 causing it to collapse. Servo valve C1 will then actuate causing pressurized oil from pump C2 to be delivered to the base of cylinder C3 and to the gland end of cylinder B4. This will cause the connected wheels adjacent axle C to turn in a clockwise steering direction as noted by the arrow on the wheels. It is noted that this direction of turn of the wheels adjacent axle C is in the opposite direction from the turn of the wheels adjacent axle C is in the opposite direction from the turn of the wheels accomplished on axle D and the mechanism and its operation as above described accomplishes this reversal of direction. Thus, with the wheels of axle D and the mechanism and its operation as above described accomplishes this reversal of direction. Thus, with the wheels of axle D turning counterclockwise and the wheels on axle C turning clockwise will, as previously mentioned establish "radiarc" steering, that is, place the wheels on the two axles in the relative position which will cause these wheels to rotate on a "radiarc" turn and it is, therefore, a fact that "radiarc" steering has been thus established. The movement of cylinder B4 will cause the viper on variable resistor C5 to move also to a lower voltage setting which will tend to correct the error in the signal in the servo valve 2. When the error signal is eliminated servo valve 2 will close and no more steering of the wheels of axle C relative to the wheels of axle D will take place.

Now, if it be assumed that while the operator has the vehicle in a right "radiarc" turn, he decides to change to a steering condition known as "crab" steer he accomplishes this by setting switch D7 to the D–7–1 position. This reverses the polarity on the variable resistor D5. The wiper on the resistor is now toward the high voltage end of the resistor, generating an error signal in valve 2. This error signal actuates the servo valve 2 to supply pressurized oil to line 10 which delivers it to the base of cylinder B4. This causes cylinder B4 to extend resulting in steering the wheels of axle C to steer to the left This bringing the wheels of axle C in line with the wheels of axle D and establishing "crab" steering. As cylinder B4 extends the wiper variable resistor C5 moves to a high voltage end of the resistor and eliminates the error signal. The vehicle has now assumed a left-hand "crab" position and this has been accomplished by changing the steering position of the wheels on axle C which is adjacent the steering position A. The arrangement has thus accomplished the desired result of changing the mode of steering by changing the position of the wheels on the axle adjacent the position which has control of the steering vehicle.

It is a fact that since the mechanisms for position B are duplicated and are symmetrical with those for position A, that a change in mode accomplished by an operator located at position B would cause the position to be assumed by a change in the position of the wheels on the adjacent axle D. Therefore, it will be seen from the drawing that upon proper actuation of the valves and switches at cab B in the same manner as at cab A there will be a result of accomplishing equivalent functions with equivalent relative position of reacting components regardless of which cab is being operated to control the steering.

To prevent the operator from encountering reverse steering under the conditions above set forth, solenoid valve A5 when the control is from the position A switches to reverse flow position so that the flow from hand pump A flows to the opposite side of the pilot valve A3. This switches pressurized oil from pump A6 to line 11 and hence to the base of cylinder A4 in such a manner that right-hand (clockwise) turning of the steering wheel will bring the vehicle back into its straight position. When the control is from position B the solenoid valve B5 accomplishes a like function.

From the foregoing description, it appears that the arrangement provides connections from one of the operator positions to actuate one of the spaced wheel steering assemblies and from the mechanism at that assembly there are further connections to actuate the other steering assembly and this means of actuation is made available from either of the operator positions. Further that in the connections between the first actuated wheel steering assembly and the second wheel steering assembly there is provided means to vary the relative movement and relative direction of steering between the two units thereby making it possible, with the same type of connections from both stations, to be assured that the same wheel assembly relative to the operator will first take up the change from one mode of steering to the other.

It is noted that the valves A5, B5, A3 and B3, and C1 and D1 are shown in diagrammatic form and it is assumed they operate by sliding longitudinally to line up the connected conduit connections in adjacent positioned conduits to change the flow through the valve. As an illustration the valve A5 as shown shows the connecting lines going through the valve transversely while if the valve were slid downward so that the upper connections were in lines with the connected flow conduits then after this downward movement there would be no flow through the valve with the downward relationship while if the valve were slid upward the direction of flow would be reversed because of the fact that the interior connections of the valve at that position cross each other.

It is also noted that the valve A5, for instance, is designed to be mechanically or manually actuated while the valves such as A3 and B3 are pilot valves so that if oil were caused to flow into or out from the end of the connections as shown that, as an example, there would be movement in the downward direction if the flow were from the bottom of the valve toward the top. The diagrammatic showing of the valves A5, B5, A3 and B3 follows that generally used in the art for diagrammatic showings of valves of the types shown.

It is noted that with the mechanism in FIG. 1 as described hereinbefore, the change in mode will always be accomplished on the wheel steering assembly adjacent the station where the operator is stationed. However, if it is desired to have the change in mode occur on the wheel steering assembly remote from the operator position, the manually operated switch assemblies A5 and B5 will be constructed as shown in FIG. 2 and are designated A′ 5′ and B′ 5′.

Figure 2:
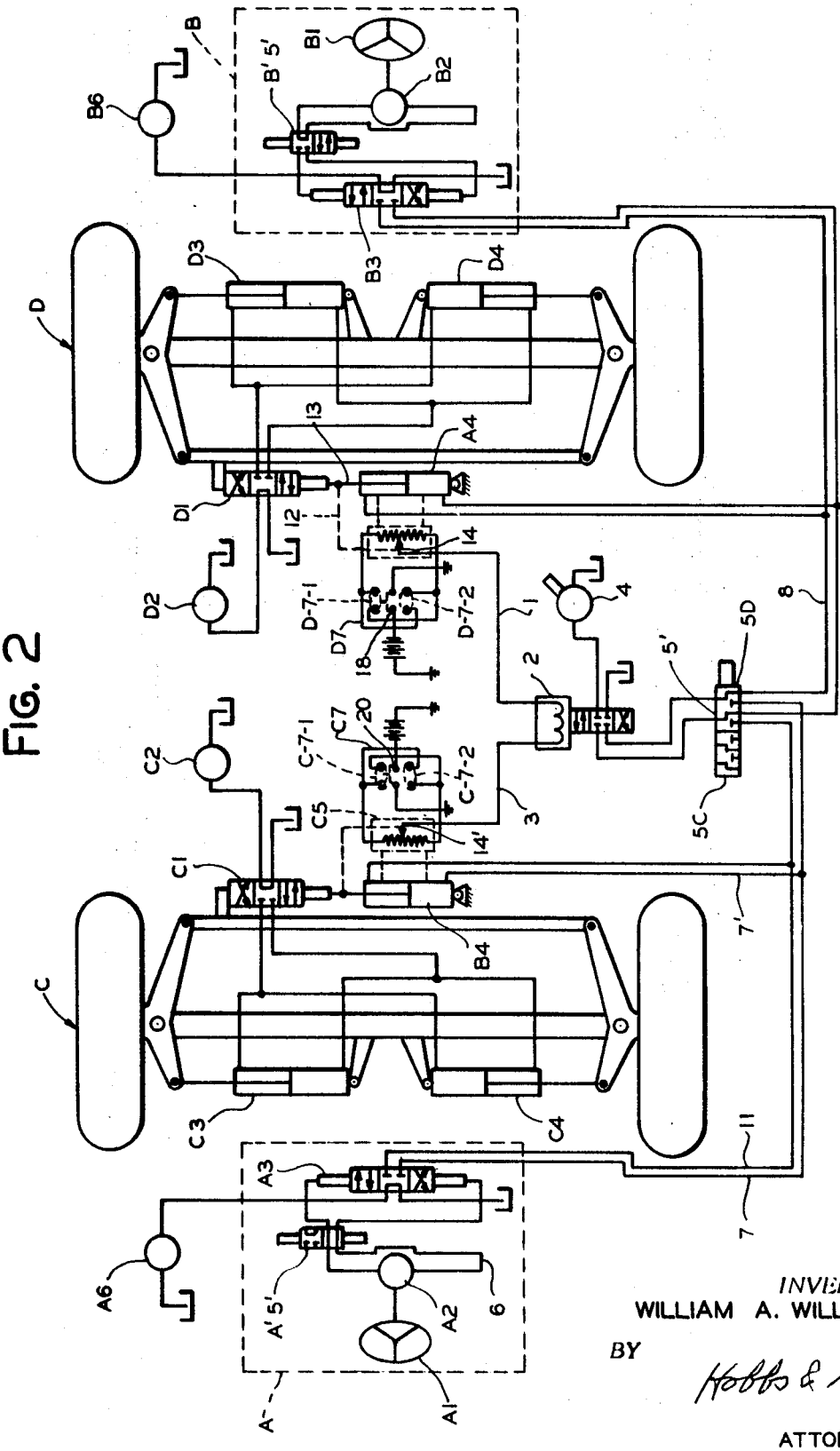
FIG. 2 is a diagrammatic showing similar to FIG. 1 but including a modified formed invention.

Also, the connection of the conduits 9 and 10 and 7 and 11 will be connected on the centrally located switch 5′ as shown in drawing FIG. 2. It is therefore established that with this FIG. 2 change in structure it will be possible to assure that the change in mode, although it will be accomplished on the same wheel assembly each time, will always be on the wheel assembly remote from the operator position as compared with the unmodified FIG. 1 hookup where the change in mode is made on the adjacent wheel assembly.

In the preferred embodiment of FIG. 1 it has been brought out in the description thereof that with the operator in position A the oil under pressure feeds through lines 7 and 8 to the cylinder A4 which is located adjacent the wheel steering assembly D which is remote from the operator position A. This is accomplished since the oil coming through the line 7 into the line 8 finds the line 8 blocked at the center valve assembly 5 therefor the pressure goes to the gland end of the cylinder A4 located adjacent the remote wheel assembly. Thus, as has been established, the mechanism for change in mode is in the control group D7 which leads from the remote wheel steering assembly D to the adjacent wheel steering assembly C. Therefore change in mode occurs on the adjacent assembly C in the FIG. 1 preferred embodiment.

Compared with the modified form of FIG. 2 however the fluid under pressure resulting from the actuation of the steering wheel assembly A1 puts pressure in line 7 and will, in the FIG. 2 modification, find a blocked line at the center valve 5′ and as a result the line 7′ will receive the oil under pressure. This line 7′ leads to the base end of actuating cylinder B4 which is located on Axle C, adjacent the operator, and, therefore, this axle, or so-called wheel steering assembly C, will be the first to receive actuation as a result of operator control and the axle D through the C7 and associated mechanism will act through the center servo valve 2 to control the remote wheel steering assembly D for change in mode. Therefore the change will first result on wheel steering assembly D, remote from the operator. Furthermore with symmetrical arrangement of controls as shown in FIG. 2 the change in mode will occur on the remote wheel steering assembly, relative to the position A or B, whichever may be selected for operator position. The relative actuation of valves A′ 5′ and B′ 5′ will assure that necessary hydraulic connections will be accomplishing this result for operator position A or B, whichever may be selected for the control.

I claim:

1. In a vehicle having pairs of wheels in spaced wheel steering assemblies for and aft on the vehicle;

each of said wheel steering assemblies having means to steer the wheels thereof with connecting mechanism between the fore-and-aft assemblies affording means to selectively steer the fore-and-aft wheels in the same direction for one mode of steering a opposite directions for another steering mode;

spaced operator positions, one adjacent each wheel steering assembly whereby said spaced wheel steering assemblies are positioned, one in an adjacent and one in a remote position relative to each said spaced operator position;

operating connections from one operator position to actuate the remote one of said wheel steering assemblies;

further operating connections from said remote steering assembly to actuate said adjacent steering assembly;

other like operating connections between the other one of said operator positioned and the respective steering assemblies which bear equivalent symmetrical remote and adjacent relationship to the said other one of said operator positions as does said first-mentioned operator position from the other end of the vehicle;

mechanism selectively operable in each of said like connections constructed to actuate the adjacent one of like connections constructed to actuate the adjacent one of said steering assemblies relative to the operator position in use to change the steering mode;

whereby the wheel steering assembly actuated to change the steering mode will be in the adjacent wheel steering assembly relative to the operator regardless of which operator position is in use.

2. In a vehicle having pairs of wheels in spaced wheel steering assemblies fore and aft on the vehicle;

eof said steering assemblies having means to steer the wheels thereof with connecting mechanism between the fore-and-aft assemblies affording means to selectively steer the fore-and-aft wheels in the same direction for one mode of steering and opposite directions for another steering mode;

spaced operator positions, one adjacent each wheel steering assembly;

whereby said spaced wheel steering assemblies are positioned, one in an adjacent and one in a remote position relative to each said spaced operator position;

operating connections from one operator position to actuate the adjacent one of said wheel steering assemblies;

further operating connections from said adjacent steering assembly to actuate said remote steering assembly;

other like operating connections between the other one of said operator positions ad the respective steering assemblies which bear equivalent symmetrical remote and adjacent relationship to the said other one of said operator positions as does said first-mentioned operator position from the other end of the vehicle;

mechanism selectively operable in each of said like connections constructed to actuate the remote one of said steering assemblies relative to the operator position in use to change the steering mode;

whereby the wheel steering assembly actuated to change the steering mode will be in the remote wheel steering assembly relative to the operator regardless of which operator position is in use.

3. In a vehicle having pairs of wheels in spaced wheel steering assemblies fore and aft on the vehicle;

each of said wheel steering assemblies having means to steer the wheels thereof with connecting mechanism between the fore-and-aft assemblies affording means to selectively steer the fore-and-aft wheels in one relative relationship for one mode of steering and in another relative relationship for another steering mode;

spaced operator positions, one adjacent each wheel steering assembly;

whereby said spaced wheel steering assemblies are positioned one in an adjacent and one in a remote position relative to each said spaced operator position;

said connecting mechanism including operating connections from one operator position to actuate a first one of said wheel steering assemblies;

further operating connections from said first one steering assembly to actuate the second one of said steering assemblies;

other like operating connections between the other one of said operator positions and the respective steering assemblies which bear equivalent symmetrical remote and adjacent relationship to the said other one of sad operator positions as does said first-mentioned operator position from the other end of the vehicle mechanism selectively operable in each of said like connections constructed to actuate the selected one of said steering assemblies relative to the operator position in use to change the steering mode;

whereby the wheel steering assembly actuated to change the steering mode will be in the same position relative to the operator regardless of which operator position is in use.

4. Mechanism as in claim 3 wherein:

the operating connections from one operator position to actuate a first one of said wheel steering assemblies include hydraulic means with fluid under pressure to actuate a first one of said wheel steering assemblies:

a further hydraulic connection from said first one of said wheel steering assemblies to actuate a second one of said wheel steering assemblies;

electrical means including a variable resistor is provided operable with said further hydraulic connecting to modify the relative direction and relative amount of actuation of said wheel steering assemblies thereby to afford a transition from one mode of steering to another.

5. Mechanism as in claim 3, wherein:

mechanism to change the steering mode includes:

a variable resistor;

an actuating means;

a servo device connected to be actuable by said actuating means and said resistor;

thereby to vary operation of said actuating means to modify relative actuation of said wheel steering assemblies to change the steering mode.

6. Mechanism as in claim 3, wherein:

said operating connections include:

actuating means from each operator position including hydraulic means with fluid under pressure fed from one spaced operator position to actuate one of said spaced wheel steering assemblies;

further hydraulic connection from said one spaced wheel steering assembly connected to actuate the of the of said wheel steering assemblies;

further connecting and actuating means operable to modify the relative amount and direction of actuation of said wheel steering assemblies.

7. Mechanism as in claim 3 wherein:

mechanism to change the steering mode includes an electrical resistor;

a connection actuated by movement of one of said wheel steering assemblies to vary current flow through said resistor;

a wheel steering assembly actuating means;

connections to said actuating means controlled by current flow thru said resistor;

whereby one of said wheel steering assemblies is actuated relative to the other to change the steering mode.